(12) United States Patent
Koning et al.

(10) Patent No.: US 7,571,206 B2
(45) Date of Patent: Aug. 4, 2009

(54) TRANSPARENT REQUEST ROUTING FOR A PARTITIONED APPLICATION SERVICE

(75) Inventors: G. Paul Koning, Brookline, NH (US); Peter C. Hayden, Mount Vernon, NH (US); Paula Long, Hollis, NH (US)

(73) Assignee: EqualLogic, Inc., Nashua, NH (US)

( * ) Notice: Subject to any disclaimer, the term of this patent is extended or adjusted under 35 U.S.C. 154(b) by 712 days.

(21) Appl. No.: 10/217,118

(22) Filed: Aug. 12, 2002

(65) Prior Publication Data

US 2004/0030755 A1 Feb. 12, 2004

(51) Int. Cl.
*G06F 15/16* (2006.01)
(52) U.S. Cl. .............. 709/203; 709/217; 709/223; 709/224; 709/229; 718/105
(58) Field of Classification Search .............. 709/203, 709/217, 219, 223–224, 227, 229; 718/105
See application file for complete search history.

(56) References Cited

U.S. PATENT DOCUMENTS

| | | | |
|---|---|---|---|
| 5,392,244 A | | 2/1995 | Jacobson et al. |
| 6,070,191 A | * | 5/2000 | Narendran et al. .......... 709/226 |
| 6,108,727 A | | 8/2000 | Boals et al. |
| 6,122,681 A | | 9/2000 | Aditya et al. |
| 6,141,688 A | | 10/2000 | Bi et al. |
| 6,144,848 A | | 11/2000 | Walsh et al. |
| 6,148,414 A | | 11/2000 | Brown et al. |
| 6,189,079 B1 | | 2/2001 | Micka et al. |
| 6,195,682 B1 | | 2/2001 | Ho et al. |
| 6,212,565 B1 | * | 4/2001 | Gupta .................... 709/229 |
| 6,226,684 B1 | * | 5/2001 | Sung et al. .............. 709/238 |
| 6,292,181 B1 | | 9/2001 | Banerjee et al. |
| 6,341,311 B1 | | 1/2002 | Smith et al. |
| 6,360,262 B1 | * | 3/2002 | Guenthner et al. .......... 709/226 |
| 6,389,462 B1 | * | 5/2002 | Cohen et al. ............. 709/218 |
| 6,434,683 B1 | | 8/2002 | West et al. |
| 6,460,083 B1 | | 10/2002 | Niwa et al. |
| 6,473,791 B1 | | 10/2002 | Al-Ghosein et al. |
| 6,498,791 B2 | | 12/2002 | Pickett et al. |

(Continued)

FOREIGN PATENT DOCUMENTS

JP 6332782 12/1994

(Continued)

OTHER PUBLICATIONS

Baltazar, H. and Garcia, A. Build Your Own SAN (2002).

(Continued)

*Primary Examiner*—Lashonda T Jacobs
(74) *Attorney, Agent, or Firm*—Hamilton, Brook, Smith & Reynolds, PC

(57) ABSTRACT

Systems and methods for providing an efficient partitioned resource server. In one embodiment, the partitioned resource server comprises a plurality of individual servers, and the individual servers appear to be equivalent to a client. Each of the individual servers may include a routing table that includes a reference for each resource that is maintained on the partitioned resource server. Requests from a client are processed as a function of the routing table to route the request to the individual server that maintains or has control over the resource of interest.

16 Claims, 4 Drawing Sheets

U.S. PATENT DOCUMENTS

| | | | |
|---|---|---|---|
| 6,598,134 | B2 | 7/2003 | Ofek et al. |
| 6,687,731 | B1 * | 2/2004 | Kavak ........................ 718/105 |
| 6,725,253 | B1 | 4/2004 | Okano et al. |
| 6,732,171 | B2 | 5/2004 | Hayden |
| 6,742,059 | B1 | 5/2004 | Todd et al. |
| 6,766,348 | B1 * | 7/2004 | Combs et al. ............... 718/104 |
| 6,813,635 | B1 | 11/2004 | Jorgenson |
| 6,850,982 | B1 | 2/2005 | Siegel |
| 6,859,834 | B1 | 2/2005 | Arora et al. |
| 6,886,035 | B2 | 4/2005 | Wolff |
| 6,944,777 | B1 * | 9/2005 | Belani et al. ................... 707/9 |
| 6,950,848 | B1 | 9/2005 | Yousefi'zadeh |
| 6,957,433 | B2 | 10/2005 | Umberger et al. |
| 6,985,956 | B2 | 1/2006 | Luke et al. |
| 7,043,564 | B1 | 5/2006 | Cook et al. |
| 7,076,655 | B2 | 7/2006 | Griffin et al. |
| 7,085,829 | B2 | 8/2006 | Wu et al. |
| 7,089,293 | B2 | 8/2006 | Grosner et al. |
| 2001/0039581 | A1 * | 11/2001 | Deng et al. .................. 709/226 |
| 2002/0008693 | A1 | 1/2002 | Banerjee et al. |
| 2002/0009079 | A1 | 1/2002 | Jungck et al. |
| 2002/0059451 | A1 | 5/2002 | Haviv |
| 2002/0065799 | A1 | 5/2002 | West et al. |
| 2002/0138551 | A1 | 9/2002 | Erickson |
| 2002/0194324 | A1 | 12/2002 | Guha |
| 2003/0005119 | A1 | 1/2003 | Mercier et al. |
| 2003/0074596 | A1 | 4/2003 | Mashayekhi et al. |
| 2003/0117954 | A1 | 6/2003 | De Neve et al. |
| 2003/0225884 | A1 | 12/2003 | Hayden |
| 2004/0049564 | A1 | 3/2004 | Ng et al. |
| 2004/0080558 | A1 | 4/2004 | Blumenau et al. |
| 2004/0083345 | A1 | 4/2004 | Kim et al. |
| 2004/0103104 | A1 | 5/2004 | Hara et al. |
| 2004/0128442 | A1 | 7/2004 | Hinshaw et al. |
| 2005/0010618 | A1 | 1/2005 | Hayden |
| 2005/0108362 | A1 * | 5/2005 | Weinert et al. ............... 709/217 |
| 2005/0144199 | A2 | 6/2005 | Hayden |

FOREIGN PATENT DOCUMENTS

| | | |
|---|---|---|
| JP | 9022374 | 1/1997 |
| JP | 2001067278 | 3/2001 |
| WO | WO-99/53415 | 10/1999 |
| WO | WO 99/53415 A | 10/1999 |
| WO | WO 01/38983 | 5/2001 |
| WO | WO 02/37943 | 5/2002 |
| WO | WO 02/44885 | 6/2002 |
| WO | WO 02/056182 | 7/2002 |

OTHER PUBLICATIONS

Druschel, P., Rice University and Rowstron, A., Microsoft Research, Cambridge, UK. PAST: A large-scale, persistent peer-to-peer storage utility.

Ottem, E. Getting the Most From Your Storage: How to Deploy SAN. Gadzoox Networks, Inc. (1999).

Networking with Pyramix.

Storage Area Networking (SAN)—The Veritas Strategy. Q Associates (2000).

Rapaport, L. and Baltazar, H. Introduction to SANs: Technology, Benefits, and Applications. (Jul. 9, 2001).

Enlist Desktops to Mirror Data. TechTarget (2002).

U.S. Appl. No. 60/411,743, filed Sep. 2002, Hinshaw et al.

Scheuermann P et al: "Data Partitioning and Load Balancing in Parallel Disk Systems" Techn. Rpt. A/02/96 University of Saarland. pp. 1-48.

Wei Lui et al: "Design of an I/O balancing file system on web server clusters" Parallel Processing 2000 Intern. Workshops on Aug. 21-24, 2000, Piscataway, NJ, USA, IEEE, Aug. 21, 2000, pp. 119-125.

Anderson T E et al: "Serverless Network File Systems" ACM Transactions on Computer Systems, Assoc. for Computing Machinery, New York, US, vol. 14, No. 1, pp. 41-79, Feb. 1, 1996.

Hac A et al: IEEE: "Dynamic load balancing in a distributed system using a decentralized algorithm" Int. Conf. on Distributed Computing Systems, West Berlin, Sep. 21, 1987. Conf. Proceedings vol. 7, pp. 170-177. Sep. 21, 1987.

Hartman J H et al: "The Zebra Striped Network File System" Operating Review (SIGOPS), ACM Headquarter New York, US vol. 27, No. 5, Dec. 1, 1993, pp. 29-43.

* cited by examiner

TRANSPARENT REQUEST ROUTING FOR A PARTITIONED APPLICATION SERVICE

FIELD OF THE INVENTION

The invention relates to file access over a network and in particular to transparent routing of client requests for files and/or other resources that reside on a plurality of servers.

BACKGROUND OF THE INVENTION

Larger corporations and other organizations may want to store records, files and other resources across several servers servicing their needs. It becomes desirable in such situations to group several servers together so that they appear to a client as a single, logical unit. Ideally, such a single logical unit would have no duplication of data objects contained therein. Furthermore, the single logical unit should have as little overhead as possible in servicing any given resource request that arrives at a server belonging to the distributed logical unit. In many situations, the requested resource object may not reside at the same server that originally receives the resource request, so that some form of forwarding, routing, or acquisition of the desired resource must occur in order to service that original resource request.

Multi-server environments are known wherein a client wishing to access specific information or a specific file is redirected to a server that has the piece of the requested information or file. The client then establishes a new connection to the other server upon redirect and severs the connection to the originally contacted server. However, this approach defeats the benefit of maintaining a long-lived connection between the client and the initial server.

Another approach is "storage virtualization" where an intermediary device is placed between the client and the servers, with the intermediary device providing the request routing. None of the servers is hereby aware that it is providing only a portion of the entire partitioned service. Adding the intermediary device adds complexity to the system.

It would therefore be desirable to provide a method and system that allows a client to contact any server in a multi-server environment and to access resources, such as files, distributed across the multi-server environment while maintaining a connection only to the contacted server.

SUMMARY OF THE INVENTION

The invention is directed to a system and a method that allow a resource request made to a server group to be laterally routed to the server having the desired resource object without making expensive query-response transactions with each and every server in the group. The connection with the server having the desired resource object should be long-lived, with that server returning said resource object to the requesting client.

It is another object of the present invention to share group membership information between the group members so that such group membership information may be deterministically processed, along with a requested resource object, to indicate a particular server assigned to have the desired resource object and do so from any server.

In accordance with the invention as embodied and broadly described herein, the invention provides, inter alia, methods, computer program products, and systems for allowing a plurality of servers to provide coherent support for incoming requests for services. To this end, the systems and methods described herein distribute, organize and maintain resources across a plurality of services. The servers are truly equivalent in that they each can respond to an incoming request in the same manner. Thus, the server appear equivalent to those clients that are requesting access to resources maintained on the system. In one embodiment, this appearance of equivalence is achieved, at least in part, by providing each server within the distributed server system, a table that lists a reference for each resource maintained by the distributed server system. The reference is preferably a direct reference in that it directly points to or otherwise references the server that is actually responsible for or has control over the resource associated with that reference. Thus, a server group according to the invention provides a system for distributed resource allocation that reduces network traffic associated with other forms of distributed resource allocation, by providing for a fixed ceiling of one level of redirection for each request for access to a resource.

Each server has access to the entire group membership information stored in the routing table. This routing table may be updated with each access and reflects changes in group membership due to additions, removals, or temporary unavailability of the various servers that make up the group. When changes have propagated through the server group, all relevant routing tables at each server will contain identical information.

When a server receives a resource request, it uses the relevant routing table to identify which group member should actually hold the resource object or a part of the resource object. The request may then be serviced by laterally accessing the desired data object from the correct server without making expensive query-response transactions over the network.

More particularly, the invention, in one aspect, includes methods for accessing a resource distributed over a plurality of servers in a network. The methods establish a connection to a server via the network, request the resource from the server, determine a distribution of the resource among the plurality of servers, and return the resource distributed over the plurality of servers via the server while maintaining a network connection to the server. Optionally, the distribution is determined from a routing table that resides on each of the plurality of servers and is synchronized between the plurality of servers. The routing table may contain a reference to the resource or to a portion of the resource residing on each of the plurality of servers. The reference may be a direct reference to the associated resource.

In another aspect the invention provides a client-server system for accessing a distributed resource. The system may comprise a plurality of servers connected to a network, a resource distributed over the plurality of servers, with each server including a routing table which associates the resource or the portion of the resource with a corresponding one of the servers.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

The systems and methods described herein include systems for organizing and managing resources that have been distributed over a plurality of servers on a data network. The invention, in part, is directed to transparent request routing for retrieving distributed resources in a partitioned resource environment. Although the systems and methods described herein will be largely directed to storage devices and applications, it will be understood by those of skill in the art that the invention may be applied to other applications, including distributed file systems, systems for supporting application service providers and other applications. Moreover, it will be understood by those of ordinary skill in the art that the systems and methods described herein are merely exemplary of the kinds of systems and methods that may be achieved through the invention and that these exemplary embodiments may be modified, supplemented and amended as appropriate for the application at hand.

Figure 1:
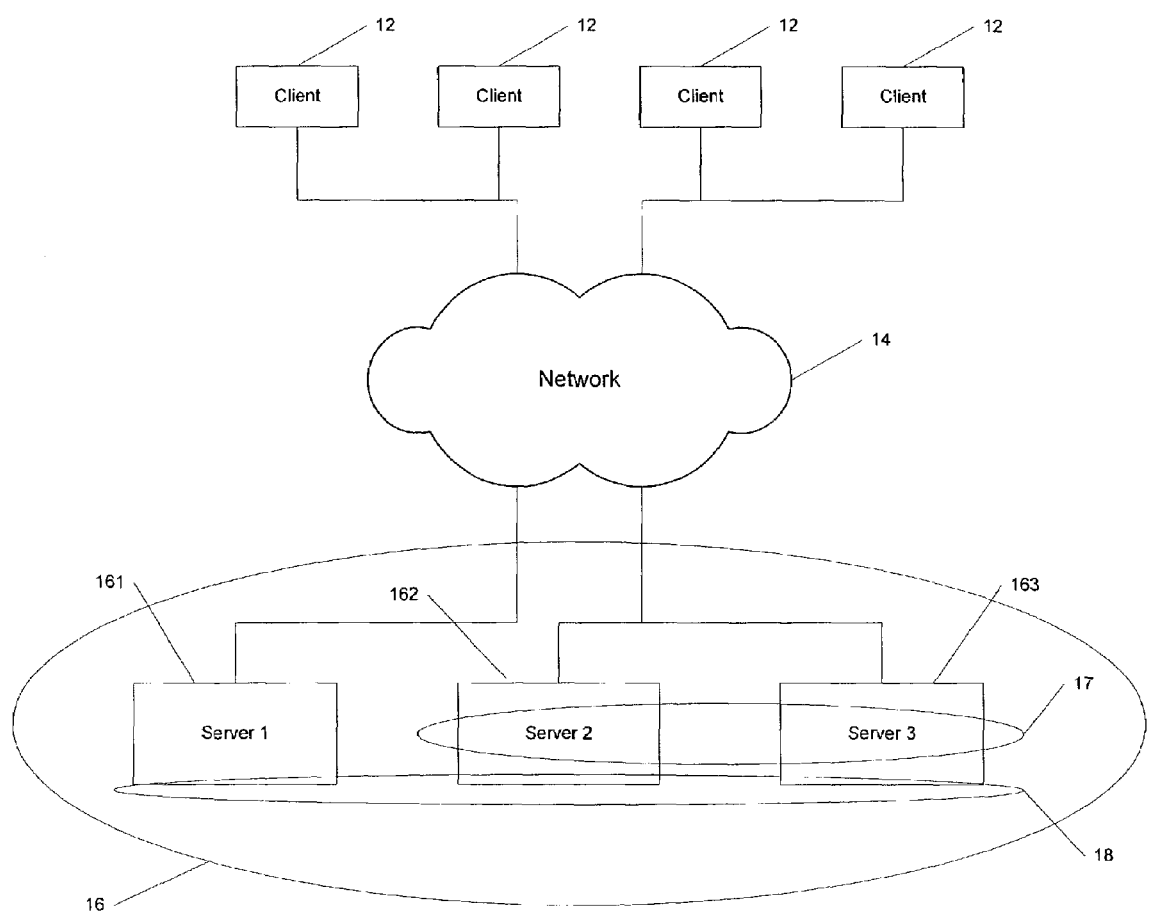
FIG. 1 is a schematic diagram of a client-server architecture with servers organized in server groups.

Referring first to FIG. 1 one embodiment of a system according to the invention is depicted. As show in FIG. 1, one or several clients 12 are connected, for example via a network 14, such as the Internet, an intranet, a WAN or LAN, or by direct connection, to servers 161, 162, 163 that are part of a server group 16.

The client 12 can be any suitable computer system such as a PC workstation, a handheld computing device, a wireless communication device, or any other such device, equipped with a network client capable of accessing and interacting with the server 16 to exchange information with the server 16. The network client may be a web client, such as a web browser that can include the Netscape web browser, the Microsoft Internet explorer web browser, the Lynx web browser, or a proprietary web browser, or web client that allows the user to exchange data with a web server, and ftp server, a gopher server, or same other type of network server. Optionally, the client 12 and the server 16 rely on an unsecured communication path, such as the Internet 14, for accessing services at the remote server 16. To add security to such a communication path, the client and the server can employ a security system, such as any of the conventional security systems that have been developed to provide to the remote user a secured channel for transmitting data aver the Internet. One such system is the Netscape secured socket layer (SSL) security mechanism that provides to a remote user a trusted path between a conventional web browser program and a web server.

The server 16 may be supported by a commercially available server platform, such as a Sun Sparc™ system running a version of the Unix operating system and running a server capable of connecting with, or transferring data between, any of the client systems. In the embodiment of FIG. 1, the server 16 can include a web server, such as the Apache web server or any suitable web server. The operation of the web server component at the server can be understood more fully from Laurie et al., Apache The Definitive Guide, O'Reilly Press (1997).

The server 16 may also include other components that extend its operation to accomplish the transactions described herein, and the architecture of the server 16 may vary according to the application. For example, the web server may have built in extensions, typically referred to as modules, to allow the server to perform the operations hereinafter, or the web server may have access to a directory of executable files, each of which files may be employed for performing the operations, or parts of the operations.

In such an arrangement, the client 12 will contact one of the servers, for example server 161, in the group 16 to access a resource, such as a file, database, application, or other resource, that is available over the network 14. The contacted server 161 itself may not hold or have control over the resource. Typically, the client 12 connects to one server within the group 16. The server group 16 is configured to make the partitioned resources available to the clients 12. For illustration, the diagram shows two resources, one resource 18 that is partitioned over all three servers, servers 161, 162, 163, and another resource 17 that is partitioned over two a of the three servers. There is no specific limit on the number of servers in a server group 16. Similarly, there is no specific limit on the number of resources. In other words, each resource may be contained entirely on a single server, or it may be partitioned over several servers—all of the servers in the server group, or a subset of the server group. In practice, there may of course be limits due to implementation considerations, for example the amount of memory available in the servers or the computational limitations of the servers. Moreover, the grouping itself, i.e., deciding which servers will comprise a group, may in one practice comprise an administrative decision. In a typical scenario, a group might at first contain only a few servers, perhaps only one. The system administrator would add servers to a group as needed to obtain the level of service required. Increasing servers creates more space (memory, disk storage) for resources that are stored, more CPU processing capacity to act on the client requests, and more network capacity (network interfaces) to carry the requests and responses from and to the clients. It will be appreciated by those of skill in the art that the systems described herein are readily scaled to address increased client demands by adding additional servers into the group 16.

An exemplary resource in the context of the present invention can be one or more volumes of data stored in form of blocks, wherein different blocks can be stored on different servers. This so-called "block storage service" can be viewed as essentially representing a network-accessible disk drive. In a conventional storage server, such a volume is contained within a single server. A conventional server may provide more than one volume, but always stores volumes in their entirety.

Figure 2:
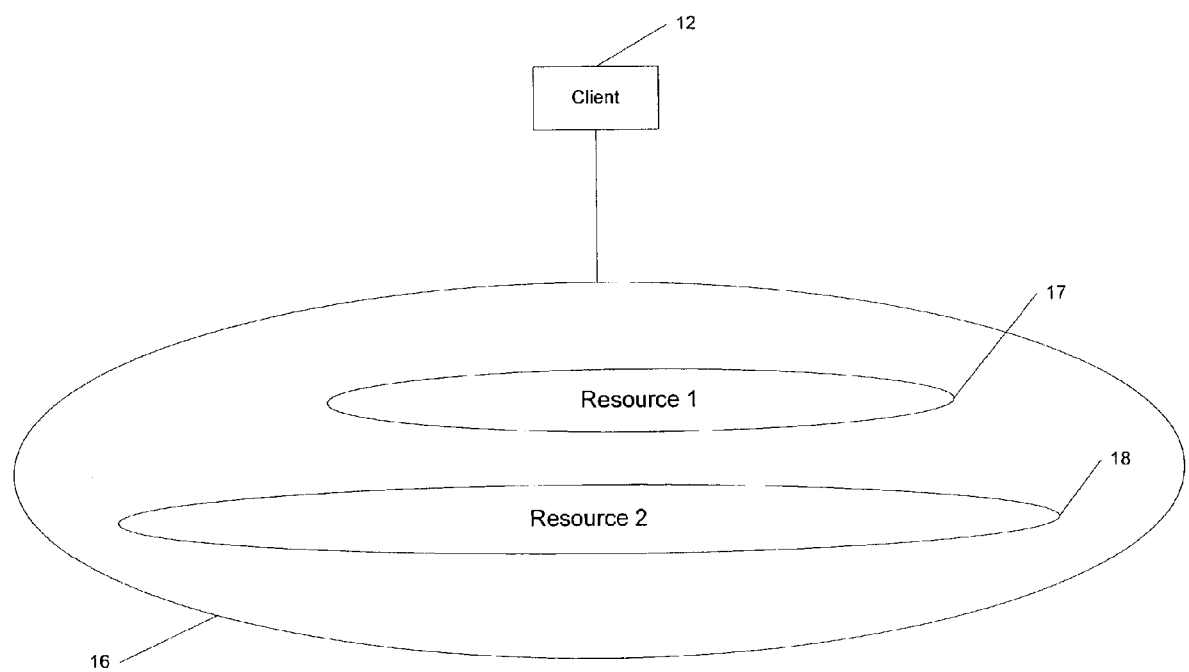
FIG. 2 is a schematic diagram of the server groups as seen by a client.

Referring now to FIG. 2, a client 12 connecting to a server 161 (FIG. 1) will see the server group 16 as if the group were a single server. The client 12 is not aware that the server group 16 is constructed out of a potentially large number of servers 161, 162, 163, nor is it aware of the partitioning of the resources 17, 18 over the several servers 161, 162, 163. As a result, the number of servers and the manner in which resources are partitioned among the servers may be changed without affecting the network environment seen by the client 12.

Figure 3:
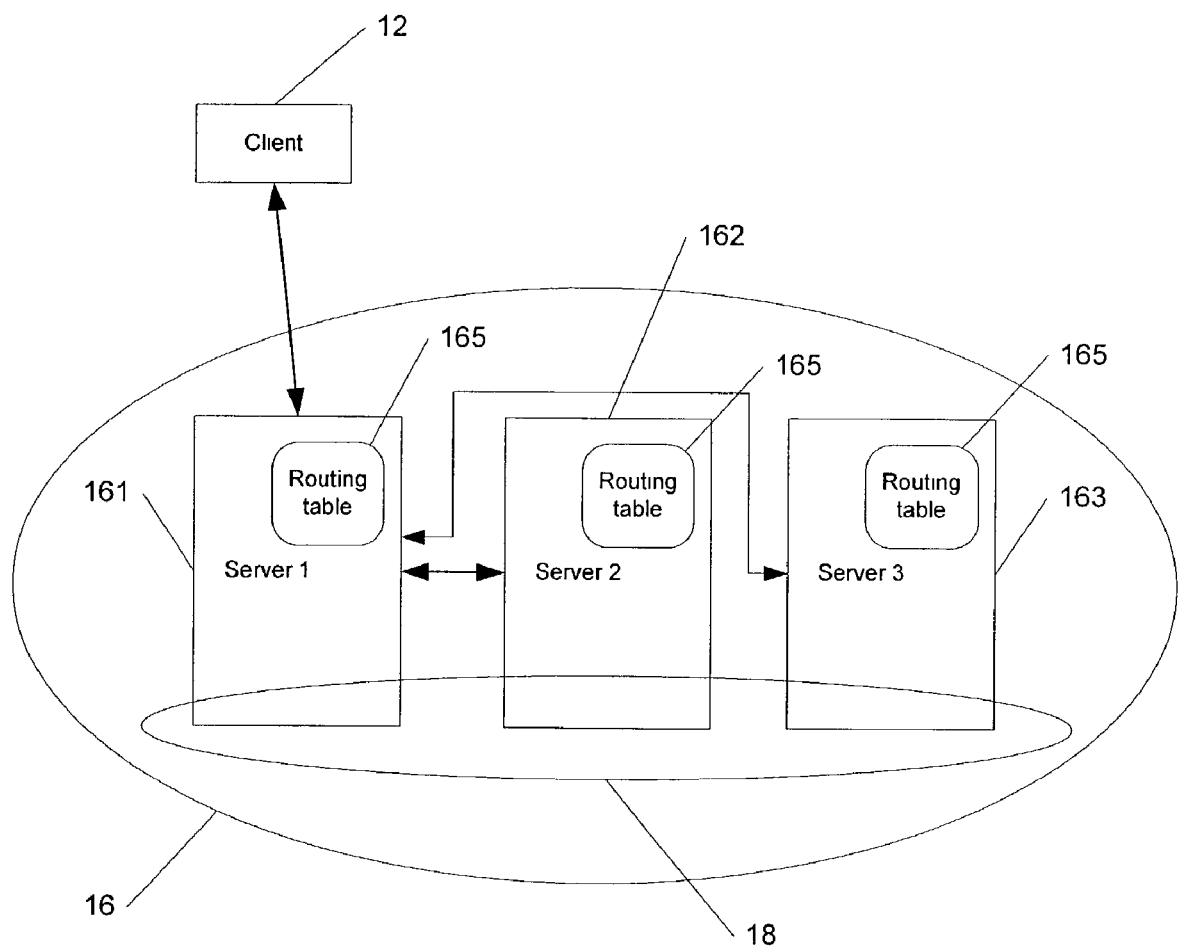
FIG. 3 shows details of the information flow between the client and the servers of a group.

Referring now to FIG. 3, in the partitioned server group 16, any volume may be spread over any number of servers within the group 16. As seen in FIGS. 1 and 2, one volume 17 (Resource 1) may be spread over servers 162, 163, whereas another volume 18 (Resource 2) may be spread over servers 161, 162, 163. Advantageously, the respective volumes are arranged in fixed-size groups of blocks, also referred to as "pages", wherein an exemplary page contains 8192 blocks.

Other suitable page sizes may be employed. In an exemplary embodiment, each server in the group 16 contains a routing table 165 for each volume, with the routing table 165 identifying the server on which a specific page of a specific volume can be found. For example, when the server 161 receives a request from a client 12 for volume 3, block 93847, the server 161 calculates the page number (page 11 in this example for the page size of 8192) and looks up in the routing table 165 the location or number of the server that contains page 11. If server 163 contains page 11, the request is forwarded to server 163, which reads the data and returns the data to the server 161. Server 161 then send the requested data to the client 12. In other words, the response is always returned to the client 12 via the same server 161 that received the request from the client 12.

It is transparent to the client 12 to which server 161, 162, 163 he is connected. Instead, the client only sees the servers in the server group 16 and requests the resources of the server group 16. It should be noted here that the routing of client requests is done separately for each request. This allows portions of the resource to exist at different servers. It also allows resources, or portions thereof, to be moved while the client is connected to the server group 16—if that is done, the routing tables 165 are updated as necessary and subsequent client requests will be forwarded to the server now responsible for handling that request. At least within a resource 17 or 18, the routing tables 165 are identical. The described invention is different from a "redirect" mechanism, wherein a server determines that it is unable to handle requests from a client, and redirects the client to the server that can do so. The client then establishes a new connection to another server. Since establishing a connection is relatively inefficient, the redirect mechanism is ill suited for handling frequent requests.

Figure 4:
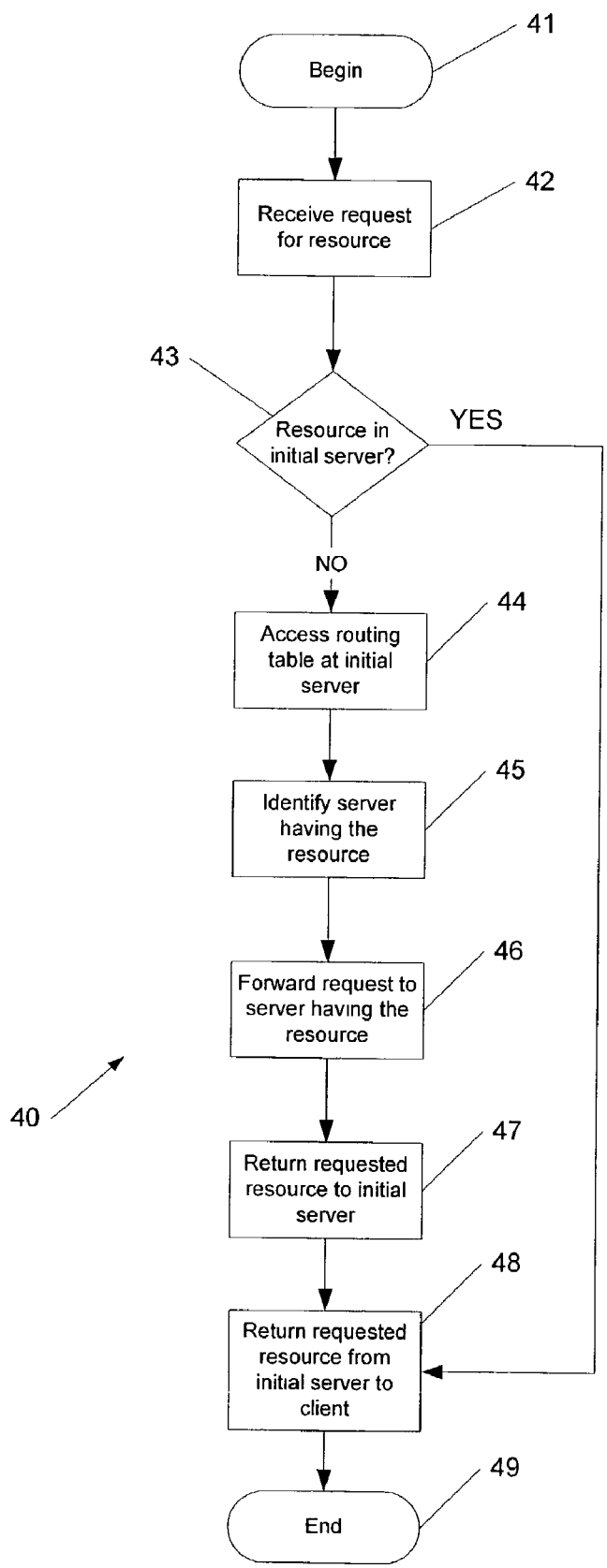
FIG. 4 is a process flow diagram for retrieving resources in a partitioned resource environment.

FIG. 4 depicts an exemplary process flow 40 for handling client requests in a partitioned server environment. The process 40 begins 41 by receiving a request for a resource, such as a file or blocks of a file, step 42. The process checks in step 43 if the requested resource is present at the initial server that received the request from the client. If the requested resource is present at the initial server, the initial server returns the requested resource to the client, step 48, and the process 40 terminates, step 49. Conversely, if the requested resource is not present at the initial server, the server will consult a routing table, step 44, to determine which server actually holds the specific piece of data requested by the client, step 45. The request is then forwarded to the server that holds the requested resource, step 46, which returns the requested resource to the initial server, step 48. The process then goes to step 48 as before, to have the initial server forward the requested resource to the client, step 48, and the process 40 terminates, step 49.

The resources spread over the several servers can be directories, individual files within a directory, or even blocks within a file. Other partitioned services could be contemplated. For example, it may be possible to partition a database in an analogous fashion or to provide a distributed file system, or a distributed or partitioned server that supports applications being delivered over the Internet. In general, the approach can be applied to any service where a client request can be interpreted as a request for a piece of the total resource, and operations on the pieces do not require global coordination among all the pieces.

Although FIG. 1 depicts the system as an assembly of functional block elements including a group of server systems, it will be apparent to one of ordinary skill in the art that the systems of the invention may be realized as computer programs or portions of computer programs that are capable of running on the servers to thereby configure the servers as systems according to the invention. Moreover, although FIG. 1 depicts the group 16 as a local collection of servers, it will be apparent to those or ordinary skill in the art that this is only one embodiment, and that the invention may comprise a collection or group of servers that includes server that are physically remote from each other.

As discussed above, in certain embodiments, the systems of the invention may be realized as software components operating on a conventional data processing system such as a Unix workstation. In such embodiments, the system can be implemented as a C language computer program, or a computer program written in any high level language including C++, Fortran, Java or basic. General techniques for such high level programming are known, and set forth in, for example, Stephen G. Kochan, *Programming in C*, Hayden Publishing (1983).

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method for accessing a resource distributed over a plurality of equivalent servers in a server group, comprising:
   establishing a direct connection between a client and any one of the equivalent servers in the server group via a network, one of the equivalent servers so connected being a connected server, the plurality of equivalent servers together making available to the client, resources that are partitioned over a subset of, or all of, the plurality of equivalent servers, such that a first portion of a partitioned resource resides on a first equivalent server and a remaining portion of the partitioned resource resides on at least one second equivalent server; and
   while maintaining the direct connection between the client and the connected server:
   receiving at the connected server a client request for the resource;
   accessing a routing table that i) resides on each of the plurality of equivalent servers, including the connected server, and that ii) identifies to each of the plurality of equivalent servers on which of the plurality of equivalent servers, including the connected server and any other equivalent servers, the requested resource resides;
   based on the accessing, using the routing table to determine, at the connected server, on which of the plurality of equivalent servers, including the connected server, the requested resource resides; and
   returning the requested resource to the client from an other server of the plurality of equivalent servers via the connected server, if the requested resource does not reside on the connected server.

2. The method of claim 1, further comprising synchronizing the routing table between the plurality of equivalent servers, including the connected server.

3. The method of claim 2, wherein the routing table contains a reference to the resource or to a portion of the resource residing on each of the plurality of equivalent servers.

4. The method of claim 2, wherein each server includes a routing table that maintains a direct reference for each resource maintained by the plurality of u servers.

5. The method of claim 1, wherein routing of client requests is done separately for each request.

6. The method of claim 1, wherein resources, or portions thereof, can be moved while the client is connected to the plurality of equivalent servers.

7. The method of claim 1, including updating the routing tables dynamically.

8. The method of claim 1, wherein a subsequent client request is forwarded to the other server that is responsible for handling the subsequent request.

9. A client-server architecture for accessing a distributed resource, comprising:
a plurality of equivalent servers in a server group connected to a network;
a resource distributed over a subset of, or all of the plurality of equivalent servers, such that a first portion of the resource resides on a first equivalent server and a remaining portion of the resource resides on at least one second equivalent server, the plurality of equivalent servers together making available to a client the resource, each of the plurality of equivalent servers including a routing table that identifies to each of the plurality of equivalent servers the resource or a portion of the resource and a corresponding one server of the plurality of equivalent servers having control over the return of the resource or portion of the resource;
wherein a client request for the resource received by one server is routed to any other server of the plurality of equivalent servers, including the one server that received the client request for the resource, based on which of the plurality of equivalent servers has control over the return of the resource or portion of the resource; and
wherein the one server that received the client request for the resource responds to the client request for the resource by returning the resource or portion of the resource from the corresponding one server of the plurality of equivalent servers to the client via the one server that received the client request for the resource, if the resource does not reside on the one server that received the client request for the resource, while maintaining a direct connection with the client.

10. The architecture of claim 9, wherein said resource comprises a file having data blocks.

11. The architecture of claim 10, wherein said routing table includes a reference to a group of the data blocks.

12. A method for providing a client with access to resources distributed over a plurality of equivalent servers in a server group, comprising:
using the plurality of equivalent servers to together make available, to the client, resources that are distributed over a subset of, or all of, the plurality of equivalent servers;
providing each of the plurality of equivalent servers with a reference table that contains a reference for each resource distributed across the plurality of equivalent servers, wherein the reference identifies a server having control over return of a respective resource, and wherein the reference table identifies to each of the plurality of equivalent servers on which of the plurality of equivalent servers resources are distributed;
detecting at an equivalent server an incoming client request for access to a particular resource of the distributed resources, and while maintaining a direct network connection between the client and the equivalent server that detected the incoming client request:
processing the detected incoming client request by querying the table to determine which of the plurality of equivalent servers, including the equivalent server that detected the incoming client request, has control over the return of the particular resource; and
returning the particular resource to the client from the server having control over the return of the particular resource via the equivalent server that detected the incoming client request, if the particular resource does not reside on the equivalent server that detected the incoming client request.

13. The method of claim 1, wherein the resource comprises a data volume.

14. The method of claim 1, wherein data of the data volume are stored in form of data blocks.

15. The method of claim 1, wherein returning the requested resource includes returning the requested resource without the client being aware that the requested resource may reside on any one of the equivalent servers.

16. A method for transparent request routing for a partitioned storage system, the method comprising:
establishing a direct connection between a client and any one of the equivalent servers in a server group via a network, one of the equivalent servers so connected being a connected server, the plurality of equivalent servers, including the connected server, together making available to the client, partitioned storage resources that are portioned over a subset of, or all of the plurality of equivalent servers, such that a first portion of a partitioned storage resource resides on a first equivalent server and a remaining portion of the partitioned storage resource resides on at least one second equivalent server, and the client being unaware of storage resources being portioned over a subset of, or all of the plurality of equivalent servers; and
while maintaining the direct connection between the client and the connected server, further comprising:
at the connected server, in response to each indication of a client requesting a partitioned storage resource, routing each client request to at least two equivalent servers on which portions of the partitioned storage resource reside, the at least two equivalent servers to which each client request is routed being any one of the plurality of equivalent servers, including the connected server;
the routing using a routing table that: i) resides on each of the plurality of equivalent servers, including the connected server; and ii) identifies to each of the plurality of equivalent servers on which of the plurality of equivalent servers, including the connected server and any other equivalent servers, portions of the partitioned storage resource reside; and
in an event of a portion of the partitioned storage resource does not reside on the connected server, returning the portion of the partitioned storage resource to the client from an other server of the plurality of equivalent servers via the connected server.

* * * * *